(12) United States Patent
Ceccaldi et al.

(10) Patent No.: US 6,436,184 B1
(45) Date of Patent: Aug. 20, 2002

(54) HYDRATION MODIFYING AGENT FOR MORTAR OR CONCRETE WITH LIMITED SHRINKAGE

(75) Inventors: Jean-Dominique Ceccaldi, Dieulefit; Laurent Izoret, Lyons, both of (FR)

(73) Assignee: Vicat, Paris la Defense Courbevoie (FR)

( * ) Notice: Subject to any disclaimer, the term of this patent is extended or adjusted under 35 U.S.C. 154(b) by 0 days.

(21) Appl. No.: 09/554,265

(22) PCT Filed: Nov. 17, 1998

(86) PCT No.: PCT/FR98/02451

§ 371 (c)(1),
(2), (4) Date: Jun. 26, 2000

(87) PCT Pub. No.: WO99/25664

PCT Pub. Date: May 27, 1999

(30) Foreign Application Priority Data

Nov. 17, 1998 (FR) .............................. 97 14593

(51) Int. Cl.[7] .............................................. C04B 11/30
(52) U.S. Cl. ...................... 106/715; 106/722; 106/732; 106/772; 106/778
(58) Field of Search ................................ 106/715, 722, 106/732, 772, 778

(56) References Cited

U.S. PATENT DOCUMENTS 4,447,269 A 5/1984 Schreuders et al.
5,360,841 A * 11/1994 Knopf et al. .................. 524/4
5,888,322 A * 3/1999 Holland ........................ 156/39

FOREIGN PATENT DOCUMENTS

| EP | 0 238 858 A2 | 9/1987 |
| EP | 0 350 904 A2 | 1/1990 |
| EP | 0 403 974 A1 | 12/1990 |
| EP | 0 518 156 A2 | 12/1992 |
| SU | 1728278 | * 4/1992 |
| WO | WO 96/27565 | 9/1996 |

OTHER PUBLICATIONS

Chemical Abstracts, vol. 111, No. 22, Nov. 27, 1989, Columbus, Ohio, US; abstract No. 197133d, I. Feuer: "Floor–equalizing dry self–spreading mortar with decreased shrinkage".

Chemical Abstracts, vol. 111, No. 22, Nov. 27, 1989, Columbus, Ohio, US; abstract No. 200687b, Ando Yutaka: "Concrete compositions for centrifugal molding".

Chemical Abstracts, vol. 101, No. 14, Oct. 1, 1984, Columbus, Ohio, US; abstract No. 115828x, Denki Kagaku Kogyo: "Water–reducing agents for concrete".

* cited by examiner

Primary Examiner—Paul Marcantoni
(74) Attorney, Agent, or Firm—Oliff & Berridge, PLC

(57) ABSTRACT

The invention concerns a hydration modifying agent for mortar and concrete comprising a combination of 30 to 80% of calcium sulphate, 3 to 60% of ethylene/propylene oxide copolymer and 0.5 to 6% of an activator for the copolymer. The invention also concerns a Portland dry cement comprising 2 to 10 wt. % of said hydration modifying agent and a method for preparing such a mortar or concrete composition, and a self-spreading concrete topping made from said mortar or concrete composition.

7 Claims, 1 Drawing Sheet

HYDRATION MODIFYING AGENT FOR MORTAR OR CONCRETE WITH LIMITED SHRINKAGE

Figure 1:
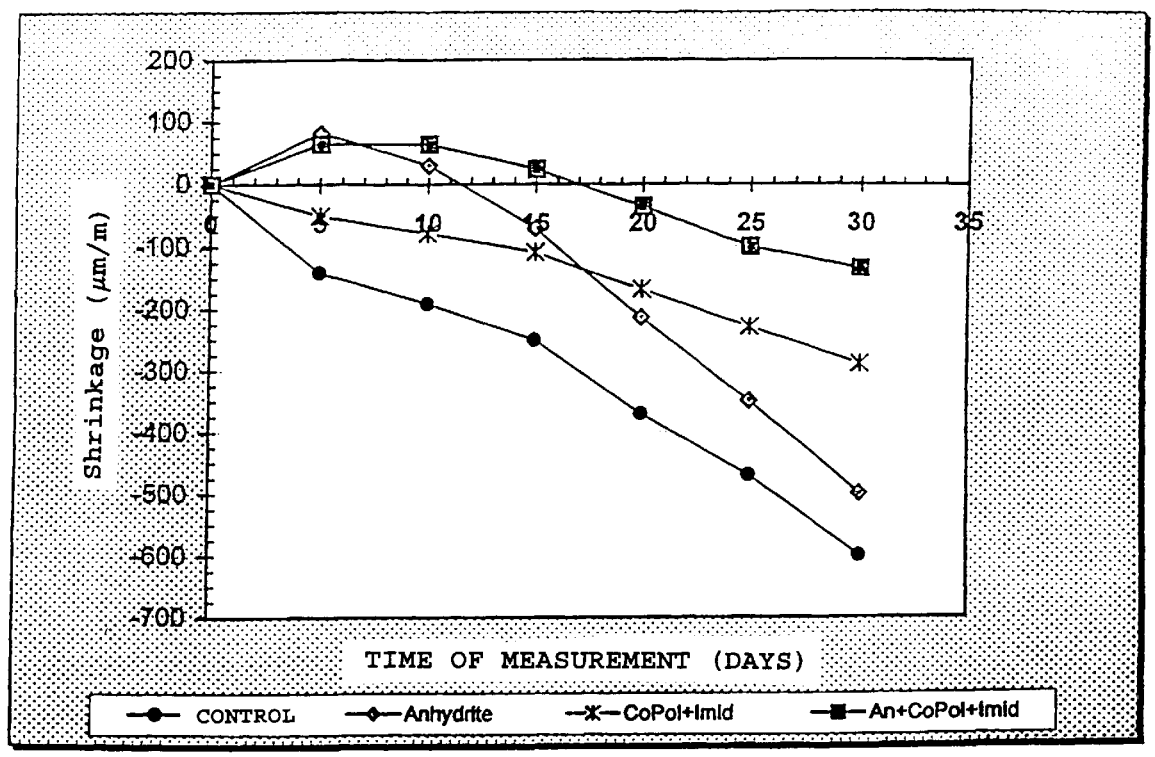

The present invention relates to a hydration modifier for mortar or concrete making it possible to obtain a limited shrinkage, to a Portland-type dry cement composition, to a ready-to-use concrete composition, to the process for preparing a mortar or concrete composition, to the use of the mortar or concrete compositions for the manufacture of construction works and to the self-leveling screeds manufactured from the mortar or concrete compositions.

In general, in order to compensate for the shrinkage of building works, it is common practice to use non-shrink admixtures which make it possible to obtain an expansive process for mortars or concretes. Among these admixtures, mention may be made, for example, of micronized aluminum powder, calcium carbide, quick lime, hydrogen peroxide, calcium sulfate, calcium aluminosulfate and iron powder. The swelling obtained with these non-shrink admixtures is of the order of 300 to 800 $\mu$m per meter after 28 days. The shrinkage of the cement/aggregate mix being of the same order of magnitude: 600 $\mu$m per meter for a mortar normalized after 28 days.

In theory, the shrinkage is therefore well compensated for, but in fact it is very difficult to control this expansion as well as the moment that it occurs.

It therefore appears important to develop a ready-to-use mortar or concrete composition which does not have these problems of controlling the expansion.

The applicant has surprisingly discovered, by turning toward a technology other than that normally employed in the field, that a mortar or concrete composition which comprises a Portland-type cement in combination with a hydration modifier produces a modified microstructure that does not lead to significant swelling during setting and limits the shrinkage during drying of the cementitious matrix of the mortar or of the concrete.

This is because the applicant noticed on the one hand that by combining at least one Portland-type cement with a modifier comprising at least three ingredients in proportions defined below, it obtained a mortar or concrete with limited shrinkage.

On the other hand, it noticed that the ingredients constituting the hydration modifier, in the proportions indicated, themselves have a synergistic action on the non-shrink effect of the Portland-type mortars or concrete.

A first subject according to the invention is a hydration modifier for mortar and concrete, comprising, in combination, from 30 to 80% of calcium sulfate, from 3 to 60% of ethylene oxide/propylene copolymer and from 0.5 to 6% of activator for the copolymer.

The calcium sulfate may be used in the form of gypsum or in anhydrous form, but in a preferred embodiment according to the invention it will be used in anhydrous form.

The ethylene oxide/propylene copolymer is a copolymer capable of being activated by the addition of an activator or catalyst. It will be possible to use copolymers differently substituted in terms of ethylene and propylene, but in a preferred embodiment copolymers consisting of 60 to 90% of ethylene oxide will be used.

The activator or catalyst makes it possible to activate the ethylene oxide/propylene copolymer used and may be any type of suitable activator. In a preferred embodiment, imidazole may be used as the activator for the ethylene/propylene [sic] copolymer.

In an even more preferred embodiment according to the invention, the hydration modifier comprises 51% of calcium sulfate, 46% of ethylene oxide/propylene copolymer and 3% of imidazole.

In another even more preferred embodiment according to the invention, the modifier comprises 80% of calcium sulfate, 18% of ethylene oxide/propylene copolymer and 2% of imidazole.

A second subject according to the invention is a ready-to-mix Portland-type dry cement composition comprising from 2 to 10% by weight of a hydration modifier according to the first subject of the invention.

The Portland-type cement may be chosen from pure or compound cements.

In a preferred embodiment according to the invention, the cement composition comprises from 4 to 6% by weight of a hydration modifier.

A third subject according to the invention is a ready-to-use mortar or concrete composition comprising from 0.5 to 2.5% by weight of a hydration modifier, according to the first subject of the invention, in combination with a Portland-type cement.

In a preferred embodiment according to the invention, the mortar or concrete composition comprises from 0.8 to 1.3% by weight of a hydration modifier.

The mortar or concrete compositions according to the invention may include other admixtures, known per se in the art, of the type mentioned below.

For example, mention may be made of admixtures which act on the setting and hardening time, such as, especially, accelerators which shorten the time between hydration of the binders and their setting, and retarders which extend the time between the hydration of the particles of a binder and the onset of its setting. As accelerators, mention may be made, for example, of calcium or sodium chlorides, certain alkalis (soda, potash, ammonia) or their salts (potassium or sodium sulfate). As retarders, mention may be made of carbohydrates (sugars, glucose, starch, cellulose), various acids or acid salts, or else zinc oxide or alkali phosphates.

Mention may also be made of admixtures which act on the plasticity and the compactness, such as plasticizers, thinning agents, called water reducers, air entrainers and thickeners. As plasticizers, bentonite, fat lime, ground limestone, flyash and keiselguhr may, for example, be incorporated. As thinning agents, naphthalene sulfonate, lignosulfates, sulfonated melanine [sic], resin soaps or synthetic detergents may be used. As air entrainers, sulfonates, sodium abietate or alkaline soaps of fatty acids may, for example, be used. As thickeners or antisedimentation stabilizers, methylcellulose, silica fume, stabilized casein and biopolymers may be mentioned.

Mention may also be made of admixtures which improve the resistance to external agents, such as antifreezing agents, which protect the material from the effects of frost until it has hardened; frost-preventing agents, which protect the hardened concretes from the effects of frost; waterproofing agents, which improve the impermeability of the concretes by reducing the possibilities of water penetrating by capillary effect; cure products, which prevent premature evaporation of the mixing water and maintain the necessary hydration. As antifreezing agents, calcium chloride or sodium aluminate may, for example, be used. As frost-preventing agents, air entrainers may be used. As waterproofing agents, silicones, fluosilicates, colloids or resins may be used. As cure products, emulsions of paraffins or waxes, oils, resins and various petroleum derivatives may, for example, be used.

The admixtures will be added in small proportions and must conform to the French standard NF P 18-103.

Depending on the season and/or the distance from the worksite to the place of manufacture, it will be possible, for example, to add superplasticizer-type rheology agents and antisedimentation agents to the mortar or concrete composition according to the invention.

The mortar or concrete compositions, so as to have a self-leveling character, may furthermore include one or more plasticizers, thinning agents, thickener and/or air entrainer.

This list is not exhaustive and the formulation of the mortar or concrete composition may be completed by adhesion promoters and antifoam agents.

In a preferred embodiment according to the invention, the mortar or concrete composition with a self-leveling character furthermore includes from 1 to 5% by weight of a thinning agent with respect to the weight of cement.

The mortar thus obtained may be pumped and spreads by itself. All that is required is to respect the levels to be attained and to carry out an outgassing operation. The building work thus constructed, such as a screed, presents the same ease of implementation as a self-leveling screed of the calcium-sulfate type, but with water insensitivity and the ability to bond to tiles in very short times. It is therefore possible to cast outdoors, and resistance to moisture penetration is obtained.

A fourth subject according to the invention is a process for preparing a mortar or concrete composition according to the invention, comprising the introduction of the hydration modifier either during the manufacture of the cement or during the mixing, after the mortar or concrete composition has been mixed.

A fifth subject according to the invention is the use of a mortar or concrete composition according to the invention for the manufacture of construction elements in the field of buildings, roads and airports, and, for example, for the manufacture of waterproofing mortars or impermeable concretes.

In a preferred embodiment according to the invention, a mortar or concrete composition with a self-leveling character according to the invention is used, for the manufacture in the field of floors [sic], and more particularly of screeds.

Finally, a sixth subject according to the invention is a self-leveling screed manufactured from a mortar or concrete composition with a self-leveling character.

The advantage of the screeds according to the invention, manufactured from mortar or concrete compositions with a self-leveling character according to the invention, is that there is no risk of secondary crystallization of the ettringitic nature at the screed/tiling interface or screed/concrete substrate interface. In addition, it is not necessary, as in the case of calcium-sulfate-based screeds, to use primer-type layers for isolating the adhesive from the cast substrate.

FIG. 1 shows the shrinkage of a cement, depending on the composition of the hydration modifier in the Portland-type cement (68% of calcium sulfate, 30% of ethylene/propylene [sic] copolymer and 2% of imidazole).

The control contains no hydration modifier.

Anhydrite means anhydrous calcium sulfate.

CoPol means ethylene oxide/propylene copolymer.

Imid means imidazol.

The shrinkage results, depending on the ingredient or ingredients or constituents added, are iven in the following table.

| Days | Control | Anhydrite | CoPol + Imid | An + CoPol + Imid |
|---|---|---|---|---|
| 0  | 0    | 0    | 0    | 0    |
| 5  | −140 | 82   | −50  | 64   |
| 10 | −190 | 30   | −78  | 64   |
| 15 | −250 | −70  | −108 | 24   |
| 20 | −370 | −214 | −168 | −36  |
| 25 | −470 | −350 | −230 | −100 |
| 30 | −600 | −500 | −290 | −135 |

It is clearly apparent that the combination of calcium sulfate, ethylene/propylene [sic] copolymer and imidazole makes it possible to obtain a synergistic effect on the shrinkage of the cement.

The examples which follow are used to illustrate the invention, but in no way constitute a limitation to the scope of the appended claims. TEST METHODOLOGY:

1—Laboratory tests:

a) mixing procedure: this is carried out in accordance with the provisions of the EN 196-1 standard. The constituents (sand, cement, additive and water) are introduced in the following ratios:

Sand/Cement ratio=3

Modifier/Cement ratio=0.053

Water/Cement (W/C) ratio=0.50.

After the standardized cycle, the modifier is introduced, this being followed by high-speed mixing for 4 minutes;

b) forming the test specimens: the mortar coming from mixing is put into the shrinkage molds, having dimensions of 4×4×16 cm or 7×7×49 cm, the molds being equipped with shrinkage blocks according to the NF P 15-433 standard. In the case of self-leveling mortars, they are formed as a single course, without vibration;

c) storage conditions:

After mixing, the molds are stored in a wet atmosphere at 95% relative humidity and 20° C. After 24 h, the test specimens are then stored in the laboratory atmosphere at 20° C. and 50% relative humidity until 48 hours have elapsed;

d) measurement conditions

For reasons of comparison with the worksite controls, the measurements of which start after 48 h, the initial measurement of the laboratory tests takes place under the same conditions.

2—Worksite tests:

a) Production of the test specimens: the mortar coming from mixing in the concrete mixer is put into the shrinkage molds, having dimensions of 7×7×49 cm or 7×7×28 cm, these being equipped with shrinkage blocks. The self-leveling mortars are laid as a single course, without vibration. The test specimens are stored on the worksite until 24 h of hardening, with a device preventing premature evaporation during setting. After 24 h, the test specimens are moved to the measurement laboratory.

b) Measurement conditions: the initial measurement is carried out after 48 h.

The performance characteristics relating to the invention may be attained by, inter alia, the following implementary examples.

EXAMPLE 1

Mixing, in a concrete mixer, of a mortar of the following composition:

Cement 450[lacuna] of CEMII B 32.5 R

0/5 Sand 1400 kg of silico-calcareous sand

Water 200 l (W/C ratio=0.44)

with or without hydration modifier according to the invention.

The modifier is introduced at the end of the mixing sequence, before discharge from the mixer truck. On arriving at the worksite, the mixer truck, in order to avoid any tendency toward segregation, may advantageously carry out a rapid-rotation sequence lasting one minute per cubic meter after optionally having added a thinning agent.

The non-shrink performance is assessed by measuring the dimensional variations of the test specimens that were produced, according to the arrangements mentioned in the paragraph relating to the test methodology, and manufactured with:

on the one hand, the above formulation without modifier: 28-day shrinkage>500 $\mu$m/m on the other hand, the same formulation with 18 kg of modifier according to the invention (containing 51% of anhydrous calcium sulfate, 46% of ethylene oxide/propylene copolymer, 3% of imidazole): 28-day shrinkage <at [sic] 150 $\mu$m/m.

EXAMPLE 2

Mixing, in a concrete mixer, of a concrete of the following composition:

cement 350 kg of CEMII A 42.5 R

0/5 Sand . . . . . . . . 800 kg

Water . . . . . . . . . . . 180 l with or without hydration modifier according to the invention.

The modifier is introduced at the end of the mixing sequence, before discharge from the mixer truck. On arriving at the worksite, the mixer truck, in order to avoid any tendency toward segregation, may advantageously carry out a rapid-rotation sequence lasting one minute per cubic meter after optionally having added a thinning agent.

The non-shrink performance is assessed by measuring the dimensional variations of the test specimens that were produced, according to the arrangements mentioned in the paragraph relating to the test methodology, and manufactured with:

on the one hand, the above formulation without modifier: 28-day shrinkage>350 $\mu$m/m on the other hand, the same formulation with 20 kg of modifier according to the invention (containing 80% of anhydrous calcium sulfate, 18% of ethylene oxide/propylene copolymer, 2% of imidazole): 28-day shrinkage<at [sic] 150$\mu$m/m.

EXAMPLE 3

Mixing, in a concrete mixer, of a self-leveling mortar of the following composition:

cement 450 kg of CEMII B 32.5 R

0/5 Sand 1400 kg

Thinning agent (powder) 3 kg of naphthalene-sulfonate type

Antifoam 100 g of biopolysaccharide type

Water 280 l with or without hydration modifier according to the invention.

The modifier is introduced at the end of the mixing sequence, before discharge from the mixer truck. On arriving at the worksite, the mixer truck, in order to avoid any tendency toward segregation, may advantageously carry out a rapid-rotation sequence lasting one minute per cubic meter.

The thinning agent is introduced upon arrival at the worksite, after the spread property of the mortar has been checked. Measured using a cone of height h=120 mm/base diameter: 133 mm/top diameter: 89 mm. The initial spread of the mortar is about 200 mm. After introducing the thinning agent and after the rapid-rotation sequence, this spread is then 400 mm, i.e. an equivalent of 700 mm with the Abrams cone.

Under these conditions, the shrinkage properties (on 7×7×49 cm test specimens) of this complete formulation and of that without the modifier are as follows:

Formulation without modifier S (28 days)>500 $\mu$m

Formulation with 28 kg of modifier, as described in Example 1 S (28 days)<150 $\mu$m The compressive strength measured on 11×22 cm cylindrical test specimens is about 23 MPa after 28 days.

EXAMPLE 4

Increasing the aggregate content and incorporating polypropylene fibers also make it possible to achieve the properties associated with the invention, as the following example shows:

Cement 400 kg of CEMII A 42.5 R

0/5 Sand 800 kg of silico-calcareous sand

5/12 Gravel 800 kg

Thinning agent 2.7 kg of sulfonated-melamine type

Antisegregation 300 g of methylcellulose type

Antifoam 100 g of silicone type

Polypropylene fibers 1 kg

Water 190 l with 25 kg or no hydration modifier as described in Example 2.

Under these conditions, the measured properties are as follows:

| 7 x 7 x 49 cm Test specimens | With modifier | Without modifier |
| --- | --- | --- |
| Initial slump with Abrams cone | 14–16 cm | 14–16 cm |
| Spread after thinning (Abrams cone) | 65–70 cm | 65–70 cm |
| 28-day shrinkage (50% RH/20° C.) | <100 $\mu$m/m | >300 $\mu$m/m |
| Compressive strength (11 x 22 cm cylinders) | 28–33 MPa | 28–33 MPa |

What is claimed is:

1. A method for making a construction work, comprising:

preparing or obtaining a hydration modifying composition, comprising:

30–80 percent by weight of calcium sulfate;

3–60 percent by weight of ethylene oxide/propylene copolymer; and 0.5–6 percent by weight of an activator;

mixing a Portland cement with the hydration modifying composition to obtain a cement or mortar composition;

mixing water with the cement or mortar composition or with he hydration modifying composition when it is mixed with the Portland type cement to obtain a slurry; and shaping the slurry in the construction work and setting and drying the construction work, wherein swelling and shrinkage are controlled during setting and drying by the hydration modifying composition.

2. The method of claim 1, wherein the activator is imidazole.

3. The method of claim 1, wherein at least one of:

the calcium sulfate is anhydrous;

the ethylene oxide/propylene copolymer comprises from 60–90 percent by weight of ethylene oxide; and the activator is imidazole.

4. The method of claim 1, wherein the hydration modifying composition comprises:

80 percent by weight of calcium sulfate;

18 percent by weight of ethylene oxide/propylene copolymer; and 2 percent by weight of imidazole.

5. The method of claim 1, wherein the cement or mortar composition comprises 2–10 percent by weight of the hydration modifying composition, before water is added.

6. The method of claim 5, wherein the cement or mortar composition comprises 4–6 percent by weight of the hydration modifying composition, before water is added.

7. A self-leveling screed manufactured by the method of claim 1.

* * * * *